United States Patent [19]

Dixon

[11] Patent Number: 4,627,775

[45] Date of Patent: Dec. 9, 1986

[54] BLIND FASTENER WITH GRIP COMPENSATING MEANS

[75] Inventor: Richard D. Dixon, San Juan Capistrano, Calif.

[73] Assignee: Huck Manufacturing Company, Irvine, Calif.

[21] Appl. No.: 528,449

[22] Filed: Sep. 1, 1983

[51] Int. Cl.[4] ............................................. F16B 13/04
[52] U.S. Cl. ........................................ 411/34; 411/38; 411/43; 411/69
[58] Field of Search .................... 411/32, 34, 35, 36, 411/37, 38, 43, 69, 70

[56] References Cited

U.S. PATENT DOCUMENTS

| 2,030,166 | 2/1936 | Huck | 411/34 |
|---|---|---|---|
| 2,030,167 | 2/1936 | Miller | 411/34 |
| 2,061,629 | 11/1936 | Huck | 411/34 |
| 2,114,493 | 4/1938 | Huck | 411/34 X |
| 2,511,920 | 6/1950 | Keller et al. | |
| 2,526,235 | 10/1950 | Huck | |
| 2,536,353 | 1/1951 | Cooper | 411/70 |
| 2,538,623 | 1/1951 | Keating | 411/43 |
| 2,887,003 | 5/1959 | Brilmayer | 411/70 X |
| 3,288,016 | 11/1966 | Reynolds | 411/34 |
| 4,033,222 | 7/1977 | Wilson | |
| 4,137,817 | 2/1979 | Siebol | 411/43 |
| 4,407,619 | 10/1983 | Siebol | 411/69 X |
| 4,432,679 | 2/1984 | Angelosanto et al. | 411/70 X |
| 4,451,189 | 5/1984 | Pratt | 411/34 |

FOREIGN PATENT DOCUMENTS

| 2133353 | 7/1971 | Fed. Rep. of Germany . | |
|---|---|---|---|
| 445204 | 2/1968 | Switzerland | 411/34 |
| 1178655 | 1/1970 | United Kingdom . | |
| 1487174 | 9/1977 | United Kingdom | 411/38 |

Primary Examiner—Gary L. Smith
Attorney, Agent, or Firm—Harness, Dickey & Pierce

[57] ABSTRACT

A blind fastener including a pin and a sleeve and having grip compensating means for accommodating workpieces varying in total thickness and having means for expanding the sleeve for filling the clearance between the fastener and associated openings in the workpieces and at the same time providing material from the sleeve in the area of expansion to define a lock between the pin and the sleeve.

15 Claims, 13 Drawing Figures

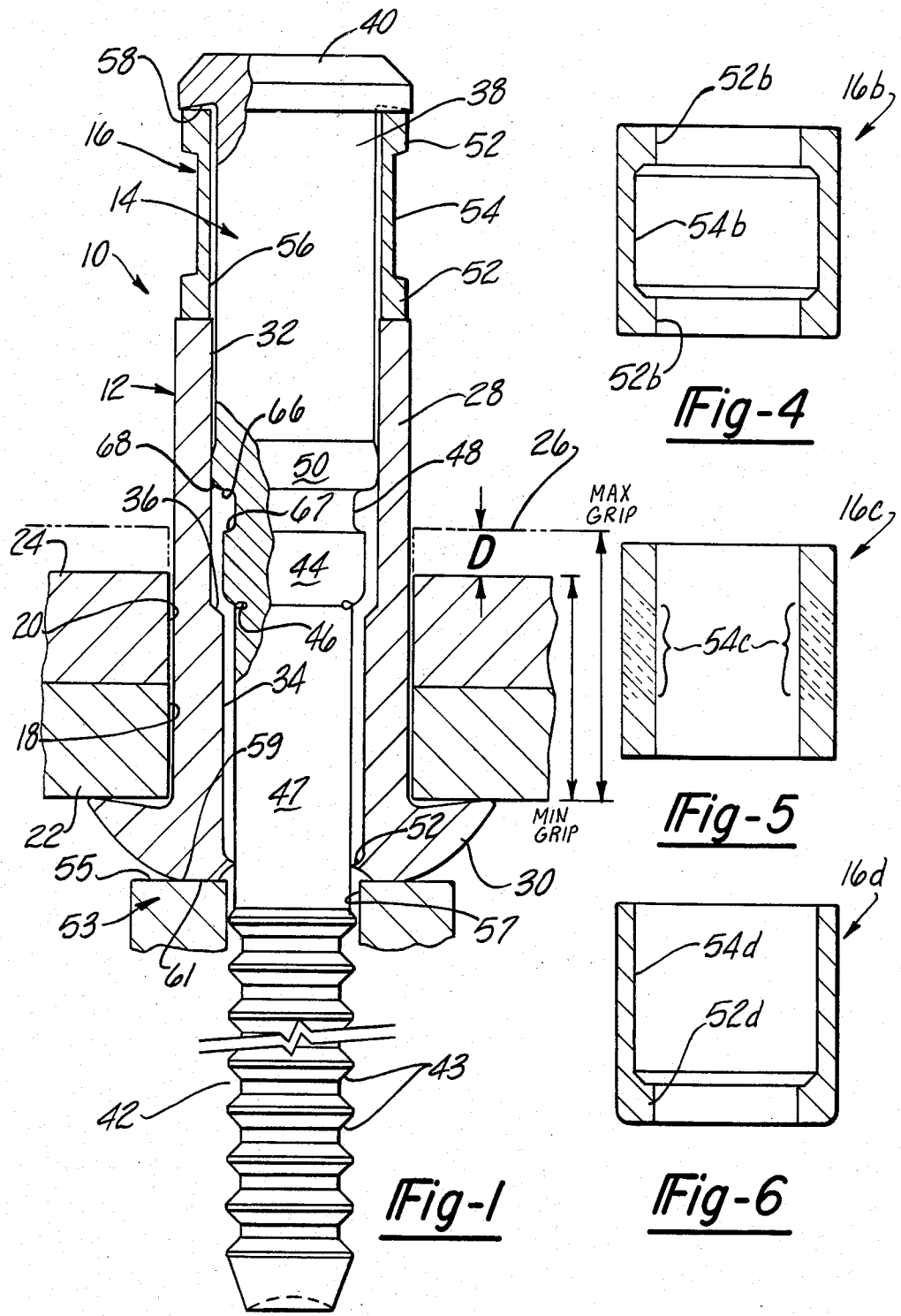

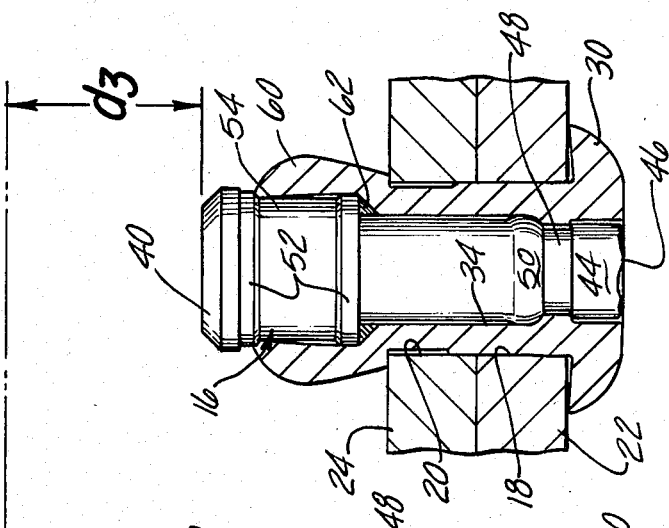
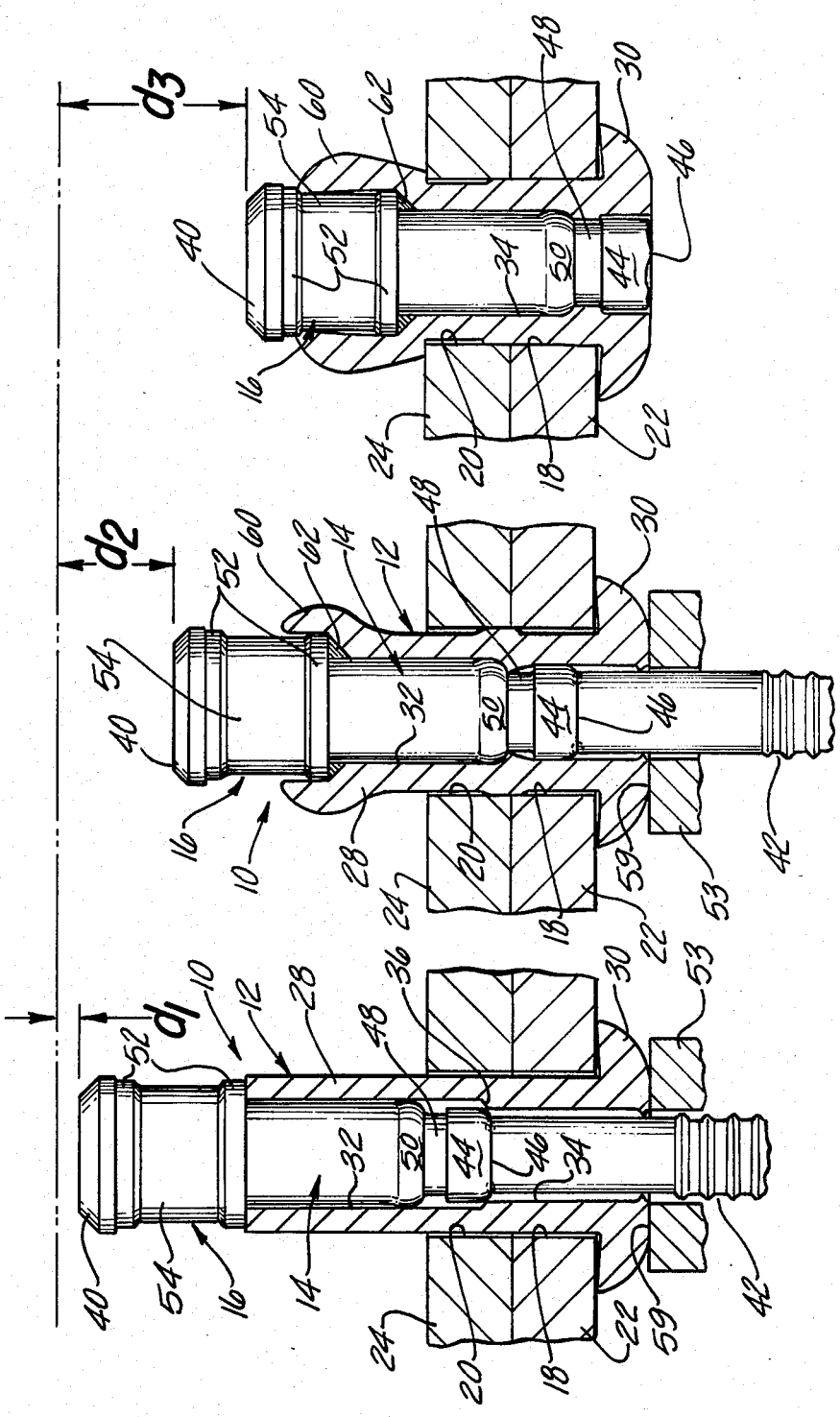

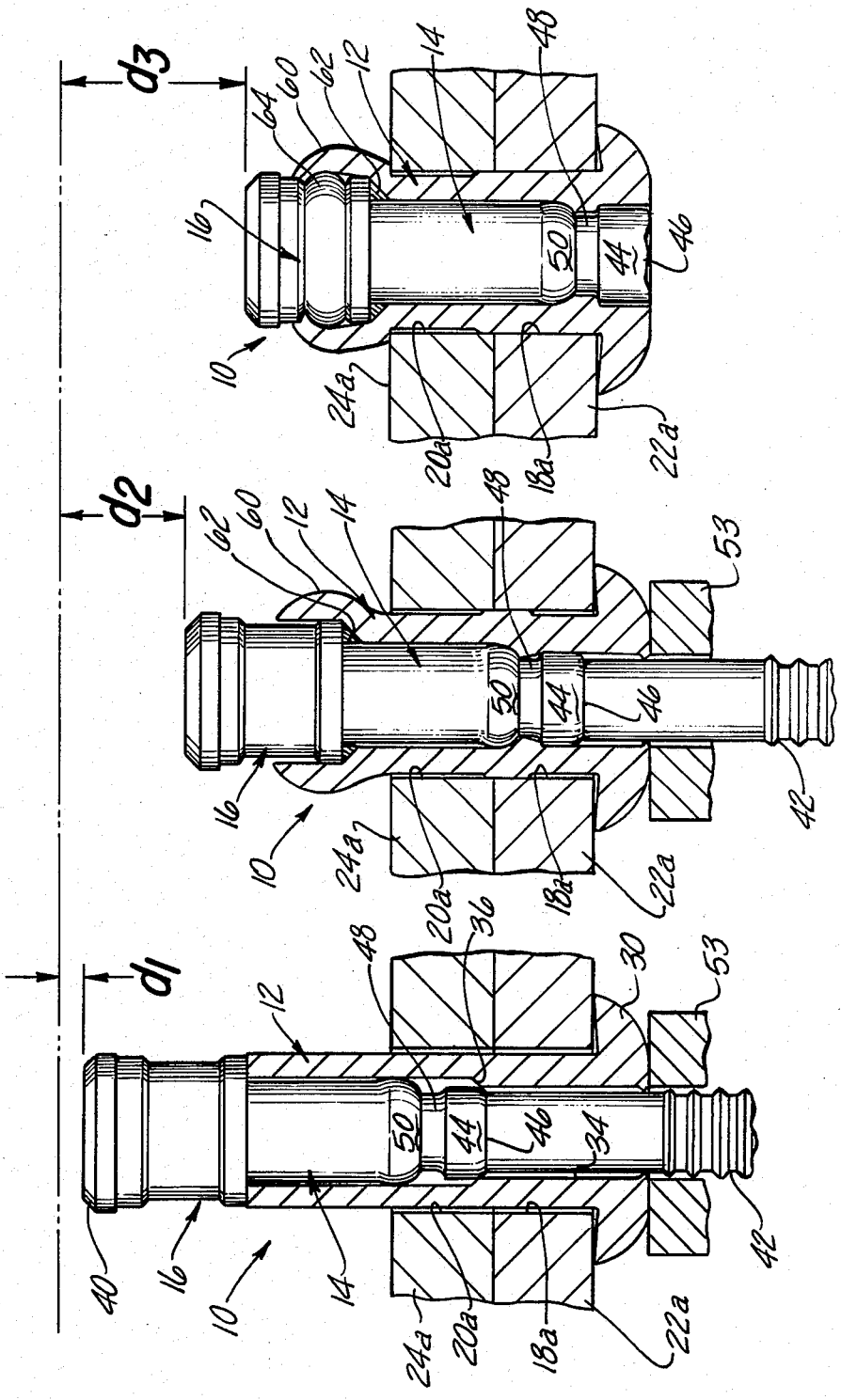

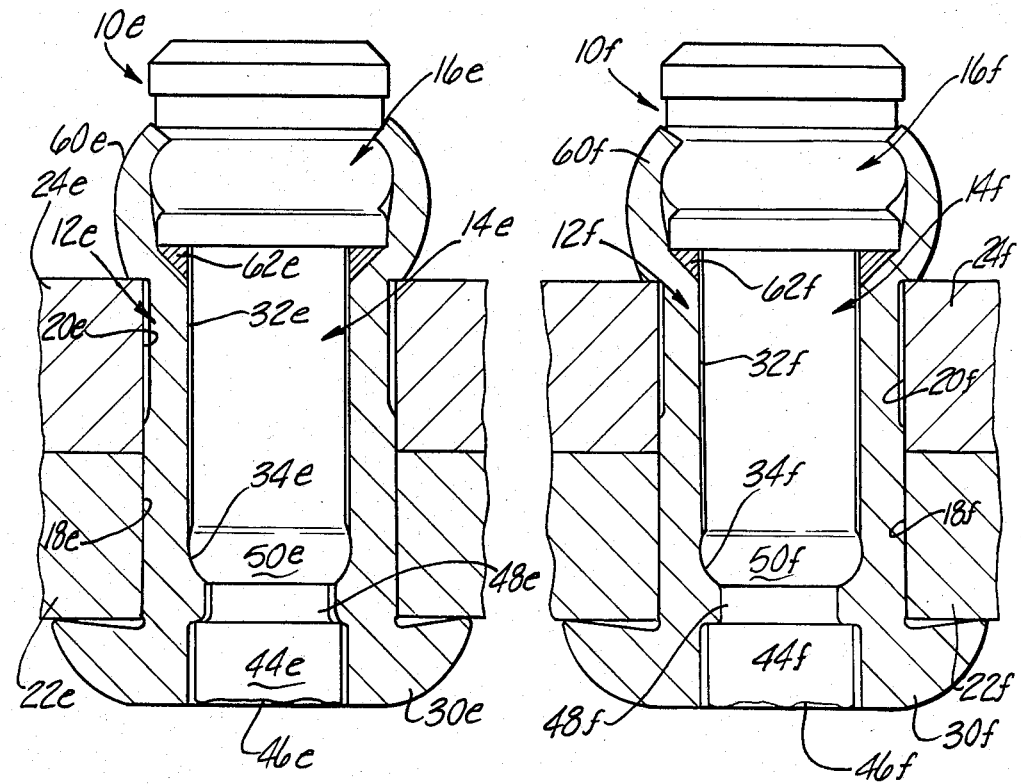
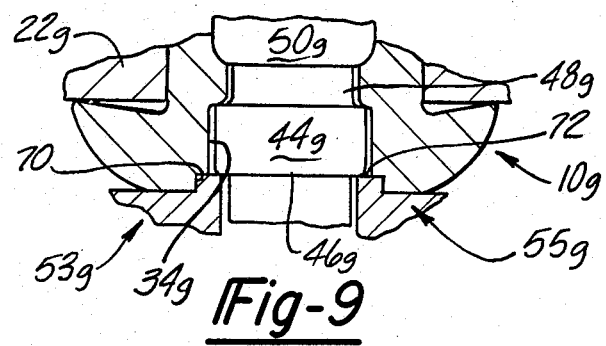

BLIND FASTENER WITH GRIP COMPENSATING MEANS

BACKGROUND AND SUMMARY OF THE INVENTION

The present invention relates to blind fasteners for securing workpieces together and more particularly to a multiple piece blind fastener including a pin (or spindle) and a sleeve and including means for compensating the fastener for use over a wide range of total thicknesses of workpieces to be secured.

Examples of multiple piece blind fasteners can be seen in the following U.S. patents: No. 3,148,578 for "Rivet and Method of Riveting", issued on Sept. 15, 1964 to Gapp; No. 3,302,510 for "Die-Draw Blind Rivet with Non-Deforming Die", issued on Feb. 7, 1967 to Gapp; No. 3,369,289 for "Die-Draw Blind Rivet with Deformable Die and the Method of Setting Same", issued on Feb. 20, 1968 to Gapp; No. 3,390,601 for "Blind Fastening Devices", issued on July 2, 1968 to Summerlin; No. 4,012,984 for "Blind Rivet Assembly With Locking Collar on Rivet Stem", issued on Mar. 22, 1977 to Matuschek; No. 4,312,613 for "Blind Rivet Assembly", issued on Jan. 26, 1982 to Binns; and No. 4,364,697 for "Blind Fastener Assembly", issued on Dec. 21, 1982 to Binns.

In many blind fastener applications it is desirable that one fastener have a wide grip range, i.e., be capable of securing together different groups of workpieces varying in total thickness. At the same time it is also desirable that the fastener have the capability of pulling the workpieces together, i.e., pull together. It is also desirable that the fastener form a blind head having a relatively large surface, i.e., "footprint", in clamping engagement with the blind side of the workpieces. In many applications it is also desirable that, after installation, the pin and sleeve are mechanically locked together.

In the present invention a novel multiple piece blind rivet is provided which includes a grip adjustment means. The grip adjustment means functions to assist in the expansion of the blind side of the sleeve and to provide an enlarged footprint to enhance clamp retention between the workpieces. At the same time the grip adjustment means is constructed to deform radially outwardly to varying extents whereby its length will be varied accordingly and whereby a wide grip range can be accommodated by a single fastener construction. The grip adjustment means in assisting the formation of the blind head on the sleeve also promotes pull together of the workpieces.

Therefore, it is an object of the present invention to provide a novel multiple piece blind fastener having grip adjustment means for providing a fastener with a wide grip range.

It is another object of the present invention to provide a multiple piece blind fastener having means for providing good pull together of the workpieces being secured. It is still another object where such pull together is enhanced by the grip adjustment means.

It is another object of the present invention to provide a multiple piece blind fastener having means for providing a blind head having an enlarged "footprint" on the blind side of the workpieces. It is another object where the formation of such enlarged "footprint" is enhanced by the grip adjustment means.

The fastener of the present invention also provides means for locking the pin or spindle and collar together with an internally formed lock. Examples of internally formed locks for blind fasteners are shown in U.S. Pat. No. 3,288,016 for "Blind Two-Piece Fastener", issued on Nov. 29, 1966 to Reynolds; see also the copending application of Walter J. Smith for "Two Piece Blind Fastener with Lock Spindle Construction", Ser. No. 425,304, filed Sept. 28, 1982, commonly assigned to Huck Manufacturing Company, and U.S. Pat. No. 3,915,052 for "Self Broaching Fastener Assembly And Like Self Sizing Fasteners", issued on Oct. 28, 1975 to Ruhl. The lock construction in the present invention functions substantially by extrusion and hence forms the internal lock by engagement of a lock shoulder in the sleeve by an extruding land on the pin; in this manner the material for the lock is formed substantially by extrusion or metal flow radially inwardly with minimal, if any, shearing of the collar lock shoulder. This construction also facilitates flowing of the sleeve shoulder material radially outwardly to provide hole fill over a significant length of the collar shank.

Therefore, it is another object of the present invention to provide a novel multiple piece blind fastener construction including a novel construction for locking the pin and sleeve together. It is still another object of the present invention to provide a novel construction which locks the pin and sleeve together while providing hole fill.

It is a general object of the present invention to provide a novel multiple piece blind fastener.

Other objects and advantages of the instant invention will be apparent in the following specification, claims and drawings.

BRIEF DESCRIPTION OF THE DRAWINGS

FIG. 1 is an elevational view, with some parts shown in section and others shown broken away, of a blind fastener, including a pin, a sleeve and grip compensating means and embodying features of the present invention and shown, prior to installation, in relationship to a pair of workpieces to be fastened together and in relationship to the anvil of an installatin tool;

FIGS. 2A-2C are sequence drawings with some parts broken away and others in section, depicting the fastener of FIG. 1 applied to workpieces of a generally minimum combined thickness with FIG. 2A showing the initiation of installation, FIG. 2B showing a generally intermediate condition in installation and with FIG. 2C showing the finally installed fastener;

FIGS. 3A-3C are sequence drawings similar to that of FIGS. 2A-2C, respectively, depicting the fastener of FIG. 1 applied to workpieces of a generally maximum combined thickness;

FIGS. 4-6 are sectional, elevational views of grip adjustment means of different constructions;

FIGS. 7-8 are fragmentary views with some parts shown in section and others shown broken away depicting the lock between the pin and sleeve in maximum and minimum hole fill conditions; and FIG. 9 is a fragmentary view showing a modified fastener in combination with a modified tool.

DESCRIPTION OF THE PREFERRED EMBODIMENT

Looking now to FIG. 1, a blind fastener 10 includes a hollow sleeve 12, a pin (or spindle) 14 and a grip compensating or adjustment sleeve 16 and is shown located in aligned openings 18 and 20, in workpieces 22 and 24, respectively, which are to be joined together. Workpieces 22 and 24 have a combined thickness generally representing the minimum grip for the fastener 10. The phantom line 26 represents the combined thickness of workpieces which would generally have the maximum grip for the fastener 10. The dimension D in FIG. 1 represents the grip range for fastener 10, i.e., the general maximum range of workpiece thicknesses in which fastener 10 operates between minimum and maximum grip.

The hollow sleeve 12 has a generally straight shank portion 28 of a uniform outside diameter which terminates at its forward end in an enlarged head 30. While the sleeve 12 is shown with a protruding type head 30 it should be understood that a flush type head could also be utilized.

Sleeve 12 has a central through bore which includes a shank bore portion 32 which extends for a preselected length of the shank portion 28 and communicates with a reduced diameter bore portion 34. The bore portion 34 extends over a substantial portion of the shank 28, including a substantial distance beyond the sleeve head 30, such that it terminates proximate to the inner surface of workpiece 24 at the blind end of the fastener 10. An annular lock shoulder 36 is defined at the juncture of shank bore portion 32 and the reduced diameter bore portion 34.

The pin 14 has an elongated generally smooth pin shank portion 38 which terminates in an enlarged head 40 at its rearward end (the blind end of fastener 10). At its opposite or forward end the pin 14 has a pull portion 42 on which is formed a plurality of annular pull grooves 43. A reduced diameter, smooth shank portion 47 connects the pull portion 42 with a larger diameter, intermediate guide and stop land 44 via an annular breakneck groove 46. The breakneck groove 46 can be generally closed and of a type shown in the U.S. patent to Fry, No. 3,292,482 and defines the weakest section of the pin 14. An annular lock groove 48 is located between the guide and stop land 44 and an enlarged, annular forming or extruding land 50.

The grip compensating sleeve 16 is of a tubular construction and is located on the pin 14 between the pinhead 40 and the blind end of the sleeve shank 28. The compensating sleeve 16 is of an externally corrugated structure defined by a pair of similar flanges 52 located at opposite ends of a reduced diameter column portion 54. The double ended construction defined by flanges 52 permits assembly onto pin 14 from either direction without concern for orientation.

The central bore 56 of compensating sleeve 16 is in slight clearance relative to the forming land 50, which defines the largest diameter of the shank of pin 14. The guide and stop land 44 is of a diameter equal to or slightly less than that of sleeve bore portion 34 whereby the front end of pin 14 will be guided as its shank is moved relatively to the sleeve 12. The pull portion 42 and adjacent shank portion 47 is smaller in diameter than the guide and stop land 44 and hence is in clearance relationship with reduced bore 34. The forming land 50 is of a diameter to provide a snug or slight interference fit with sleeve shank bore portion 32. The outside diameter of flanges 52 of compensating sleeve 16 is less than the outside diameter of the shank 28 of sleeve 12; it is also less than the outside diameter of pin head 40. In fact, a radially inwardly tapered recess 58 is adapted to receive and capture the engaging surface of the adjacent one of the flanges 52. After assembly of the compensating sleeve 16 and sleeve 12 onto the pin 14, the sleeve head 30 is staked to form a radially inwardly extending protrusion 52 which serves to hold the noted components of fastener 10 together for ease of handling.

The fastener 10 is adapted to be set by an installation tool 53 which generally can be of a type well known in the art and hence the specific details thereof have been omitted for simplicity. However, it should be noted that the tool has a chuck jaw assembly (not shown) which is adapted to grippingly engage the pull grooves of the pull portion 42 while an anvil 55 engages the enlarged sleeve head 30. Upon actuation of the tool, the jaw assembly moves axially away from the anvil whereby a relative axial force is applied between the pin 14 and sleeve 12. The anvil 55 has a central bore 57 which receives the pull portion 42 in clearance relationship but is of a diameter less than the guide and stop land 44; this serves a purpose to be described. The engaging surface 59 of anvil 55 is generally flat and hence matches the flat contour of the outer surface 61 of sleeve head 30. The flat outer surface 61 extends for around one-half of the diameter of the sleeve head 30 and provides a good bearing surface for the anvil 55 to minimize distortion during the application of installation loads.

As the relative axial force applied by the tool 53 increases in magnitude, the pin 14 is pulled into the sleeve 12 and, in a manner to be seen, the blind end of sleeve shank 28 is expanded to form an enlarged, tulip-shaped blind head (such as blind head 60 shown in FIG. 2C). It will also be seen that the compensating sleeve 16 not only forms the blind head in sleeve shank 28 in a manner to facilitate pull together of the workpieces (such as workpieces 22, 24) but also promotes the formation of the blind head to provide an enlarged "footprint" or engaged head surface against the blind side of rear workpiece 24. More importantly, perhaps, is the construction of the compensating sleeve 16 whereby a wide grip range can be provided for the fastener 10. The preceding can best be seen via the sequence drawings 2A–2C and 3A–3C.

Looking now to FIGS. 2A–2C, in FIG. 2A the pin 14 has been pulled a distance (shown as $d_1$) relative to the sleeve 12. In this position a slight amount of bulbing may occur in the shank of the sleeve 12 adjacent the blind side of workpiece 24. The guide and stop land 44 has moved partially into the reduced sleeve bore 34. The radially outer surface of land 44 is radiused to facilitate entry into and initial alignment with bore 34.

As the pin 14 is pulled farther into the sleeve shank 28, e.g., at distance $d_2$ as shown in FIG. 2B, the adjacent flange 52 is moved into the bore portion 32. As this occurs the flange 52 can shear an annular ring 62 from the engaged end surface of the sleeve shank portion 28, thereby facilitating penetration of the flange 52 into bore 32. The affected end portion of the sleeve shank portion 28 expands radially outwardly over the flange 52 as the formation of the tulip-shaped blind head 60 is initiated. The column portion 54 of compensating sleeve 16 has not significantly deformed radially outwardly. As will be seen, radial outward deformation of column portion 54 results in a change in length of sleeve 16 and it is this change in length for different thicknesses of workpieces which provides adjustment for variations in grip. Note that the radially inwardly tapered recess 58 in pin head 40 directs the engaging one of flanges 52 radially inwardly thereby inhibiting any tendency for the pin head 40 to be moved into the sleeve bore 56.

In the condition of the fastener 10 in FIG. 2B, the forming land 50 has engaged the sleeve lock shoulder 36 and has directed some of the material from that shoulder 36 and the adjacent portion of reduced bore 34 radially inwardly into the lock groove 48 in pin 14. At the same time land 50 has also expanded the shoulder 36 and adjacent bore portion radially outwardly to fill the clearance between sleeve shank 28 and the bore 20 of rear workpiece 24.

In the condition of fastener 10 in FIG. 2C, the pin 14 has been moved a distance $d_3$. With this relative movement the formation of the blind head 60 has been completed and at the same time the pin lock groove 48 has been generally filled via sleeve material extruded therein by the forming land 50. At this time, the breakneck groove 46 is located near the outer end of the enlarged sleeve head 30 and further movement of the pin 14 is inhibited as the guide and stop land 44 engages the stop surface 59 of the anvil 55 surrounding the bore 57. Continuous application of relative force by the tool between the pin 14 and sleeve 12 results in fracture of the shank of pin 14 at the breakneck groove 46. This completes the installation of the fastener 10. Note that the land 50 has also expanded the sleeve shank 28 to fill the bores 20 and 18 over the distance traveled by the land 50 within the reduced sleeve bore 34. While the lock groove 48 is not filled to its maximum depth, it is filled across the width to a sufficient depth to generally provide a full shear area to resist axial separation of the pin 14 from the sleeve 12.

Note that the compensating sleeve 26 has not significantly deformed radially outwardly at its column portion 54 in this minimum grip condition of FIGS. 2A–2C. In some constructions, however, buckling may occur even in the minimum grip condition. In any event, however, with the fastener 10, the column portion 54 will buckle or deform radially outwardly to greater degree for grips, increasing from the minimum grip of FIGS. 2A–2C to the maximum grip of FIGS. 3A–3C. As noted, the increase in buckling will result in a change in axial length of the sleeve 16 whereby the necessary grip adjustment is provided. This can be seen from a consideration of the installation of fastener 10 in a maximum grip condition as shown in FIGS. 3A–3C.

In FIGS. 3A–3C, modified components which are similar to like components in FIGS. 1 and 2A–2C have been given the same numeral designations with the addition of the postscript letter "a".

Thus in FIGS. 3A–3C the fastener 10 is shown in assembled relationship to workpieces $22_a$ and $24_a$ having aligned openings $18_a$ and $20_a$, respectively. The combined thicknesses of the workpieces $22_a$ and $24_a$ define the maximum grip for the fastener 10. In FIGS. 3A–3C the fastener 10 is depicted with the pin 14 having moved the same relative distances $d_1$–$d_3$ as depicted in FIGS. 2A–2C. Thus in FIGS. 3A and 3B, these intermediate conditions of the fastener 10 are generally similar to that of FIGS. 2A and 2B. With the fastener 10 in the maximum grip condition in FIG. 3B, however, the blind head 60 is nearer to the rear surface at the blind side of workpiece $24_a$. Thus the formation of the blind head 60 will be completed before the pin 14 has moved the distance $d_3$. FIG. 3C shows that, as with the minimum grip condition of FIGS. 2A–2C, when the pin 14 has moved the distance $d_3$, the lock groove 48 will be generally filled and the breakneck groove 46 appropriately located adjacent the outer surface of the enlarged sleeve head 30. At the same time the clearance between bores $18_a$ and $20_a$ and the sleeve shank 28 has been filled with the material from the reduced sleeve bore 34 via expansion by the land 50. The compensating sleeve 16, however, now functions to accommodate the difference in grip.

Thus, as the pin 14 is moved towards its completed position the column portion 54 of compensating sleeve 16 buckles radially outwardly resulting in a change in length as shown by bulb 64 in FIG. 3C. This deformation or buckling (and resultant change in length) continues with the lock groove 48 being substantially filled with the extruded material from the sleeve lock shoulder 36 and adjacent sleeve wall. The lock groove 48 is thus substantially filled when the guide and stop land 44 engages the flat, stop surface 59 of anvil 55 whereby further pin motion is inhibited and the shank of the pin 14 is fractured at the breakneck groove 46 located near the outer end of sleeve head 30, generally as shown in FIG. 3C. As noted, the pin 14 travels the same overall relative distance $d_3$ regardless of grip.

The compensating sleeve 16 is formed with the flanges 52 to have sufficient strength to assure penetration into the bore 32 of the sleeve shank 28. The flanges 52 also are of sufficient strength and/or stiffness such as to resist collapsing on movement within the bore 32. At the same time the column strength of the column portion 54 is provided such as to resist substantial deformation or buckling at the forces required to gain penetration into the sleeve bore 32 and to form the blind tulip-shaped head 60. In this regard, shearing of the ring 62 assists in gaining penetration without excessive load build-up. At the same time buckling or deformation of the column portion 54 will occur after such penetration and at loads substantially less than that at which breakneck groove 46 fractures such that premature fracture is avoided.

In considering the functioning of fastener 10 in FIGS. 2A–2C and 3A–3C it can be seen that as the compensating sleeve 16 moves into the bore 32 in shank portion 28 the tulip-like expansion of the sleeve urges the rear workpiece 24 ($24_a$) towards the front workpiece 22 ($22_a$) providing for good pull together. Also because the sleeve shank 28 moves radially outwardly over the penetrating flange 52 (which generally maintains its integrity) a large surface ("footprint") is defined on the blind head 60 which engages the blind surface of the workpiece 24 ($24_a$). Thus not only are the workpieces 22, 24 ($22_a$, $24_a$) pulled together at a relatively high clamp force, but also the enlarged "footprint" of the blind head 60 enhances the tensile characteristic of the resultant joint.

It should also be noted that with the construction of fastener 10 wire drawing of the pin 14 need not be relied upon for grip adjustment or compensation. The sleeve 12 is shown to be in a clearance relationship in openings 18, 20 ($18_a$, $20_a$) for workpieces 22, 24 ($22_a$, $24_a$). This clearance relationship can vary from a snug fit to a preselected maximum clearance; as will be seen, the lock groove 48 is provided with a predetermined volume to accommodate variations in hole fill (clearance) requirements while still providing an adequate lock between pin 14 and sleeve 12. Note that the forming land 50 has a surface 66 extending generally transversely to the axis of the pin 14. The radially outer end 68 (see FIG. 1) of the surface 66 is provided with a generous radius to inhibit shearing of the material moved from the lock shoulder 36 and the adjacent bore portion either radially inwardly to fill the lock groove 48 and/or outwardly to provide hole fill. In a similar manner the confronting surface 67 on stop land 44 while slightly radiused defines, with surface 66, a lock groove having a relatively wide effective width to resist separation of pin 14 from sleeve 12.

The relative hardnesses of the compensating sleeve 16 and hollow sleeve 12 can be readily selected along with the necessary geometry to provide the function previously described. In one application with a fastener 10 constructed generally as shown in the drawings, the pin was made of an alloy steel having a hardness of $R_C$ 48–52, the sleeve 12 was made of 5056 aluminum having a hardness of $R_B$ 38, and the compensating sleeve 16 was made of a carbon steel having a hardness of $R_B$ 90–94.

The compensating sleeve could have various shapes. For example, the flange 52 adjacent the pin head 40 could be eliminated; proper orientation of the compensating sleeve, however, would be required to locate the single flange (such as 52) adjacent the sleeve shank 28. Other modifications of compensating sleeve constructions are shown in FIGS. 4–6 in which components similar to like components in FIG. 1 are given the same numerical designation with the addition of letter postscripts "b", "c" and "d", respectively.

Thus in FIG. 4 the compensating sleeve 16$_b$ has annular flanges 52$_b$ at opposite ends extending radially inwardly from the column portion 54$_b$. Deformation or column buckling would occur in the column portion 54$_b$.

In FIG. 5 a sleeve 16$_c$ can be provided of a uniform cross-section; the center portion 54$_c$, however, is annealed or softened to facilitate radial deformation or buckling.

FIG. 6 depicts a variation of the sleeve of FIG. 4 and hence compensating sleeve 16$_d$ is provided only with one annular flange 52$_d$ extending radially inwardly from one end of the column portion 54$_d$; in this form the flanged end would be oriented to engage the confronting end of sleeve shank 28.

As noted, the pin 14 will move substantially the same distance (d$_3$) relative to the sleeve 12 over the entire grip range, i.e., from minimum to maximum grip. At the same time the forming or extruding land 50 from the point of engagement with the lock shoulder 36 will move within the reduced diameter sleeve bore 32 a constant distance over the entire grip range. Thus the volume of material available to provide expansion for hole fill and to provide the lock for groove 48 will be generally the same. Yet the available sleeve material must be adequate to provide hole fill in the maximum clearance condition, i.e., between sleeve shank 28 and workpiece openings 18, 20, 18$_a$, 20$_a$, and at the same time provide ample material to form the lock within lock groove 48. On the other hand, in a minimum clearance condition the lock groove 48 should have a sufficient volume to receive more of the extruded sleeve material; if the latter volume is too small and the groove 48 becomes completely filled before the pin 14 attains its final, desired position, fracture at breakneck groove 46 could occur prematurely at a position too far within the sleeve 12. In the construction of the present invention the lock groove 48 is provided with sufficient volume to act as a reservoir to accommodate the variations between maximum and minimum clearance or hole fill conditions while still providing a good lock between pin 14 and sleeve 12. In this regard it should be noted that the lock groove 48 is quite wide (via surfaces 66 and 67) whereby the lock material extruded therein will provide a significant shear area to resist push-out or separation of the pin 14 from the sleeve 12. The depth of the groove 48 can be selected to assist in providing the desired volume while still being of sufficient strength to resist fracture or significant distortion prior to the desired fracture of the breakneck groove 46.

Thus in one embodiment a pin 14 and sleeve 12 having the following dimensions were satisfactory for a nominal 5/32" fastener:

| pin 14: | |
|---|---|
| shank portion 38 | diameter .106" |
| forming land 50 | diameter .108" |
| lock groove 48 | diameter .079" |
| | width .031" |
| stop land 44 | diameter .095" |
| sleeve 12: | |
| shank bore 32 | diameter .107" |
| reduced bore 34 | diameter .097" |
| shank 28 | diameter .158" |
| flat 61 | diameter .200" |
| workpieces 22, 24 | |
| total clearance between openings 18, 20 and shank 28 | .001" minimum .005" maximum |

The reservoir-like function of the lock groove 48 can be seen from the drawings of FIGS. 7 and 8. In the drawings of FIGS. 7 and 8 components similar to like components in FIG. 1 will be given the same numeral designation with the addition of letter postscripts "e" and "f", respectively.

Thus in FIG. 7 fastener 10$_e$ is shown for securing workpieces 22$_e$ and 24$_e$ having openings 18$_e$ and 20$_e$, respectively. The openings 18$_e$ and 20$_e$ generally define the maximum clearance condition relative to the sleeve shank 28$_e$. Note that while the forming land 50$_e$ has expanded the sleeve shank 28$_e$ to fill the openings 18$_e$ and 20$_e$ from the sleeve material defining reduced bore 34$_e$, there is sufficient excess sleeve material to adequately fill the lock groove 48$_e$ across its width. Thus, in the maximum clearance condition lock groove 48$_e$ will be substantially filled across its width while still having additional capacity in its depth. Hence the effective shear area resisting pin separation or push-out will be defined by the width of lock groove 48$_e$. Note that the groove 48$_e$ is filled to approximately one-half of its depth.

In FIG. 8 the fastener 10$_f$ is shown for securing workpieces 22$_f$ and 24$_f$ with openings 18$_f$ and 20$_f$, respectively, having the minimum clearance with sleeve shank 28$_f$. Here the lock groove 48$_f$ will be substantially completely filled with the excess sleeve material after sleeve expansion filling openings 18$_f$ and 20$_f$. Note that at the position that lock groove 48$_f$ is completely filled the pin 14$_f$ will be located at its desired position for fracture at breakneck groove 46$_f$, i.e., after engagement of the stop land 44$_f$ with the anvil (such as 55) of the installation tool. It is not necessary that the lock groove 48$_f$ be completely filled in the minimum clearance condition but rather that if complete fill does occur it does so when the pin 14$_f$ has substantially completed it motion and reached the desired final position for fracture.

While the sleeve material for the lock in groove 48$_e$ in the maximum clearance condition (FIG. 7) does not extend to the full depth of the groove, it will provide retention of the pin 14$_e$ substantially as effective as that in the greater fill condition of FIG. 8 since the effective shear areas of the locks in both the maximum and minimum clearance conditions will be the same.

By providing a lock groove 48 of substantial width and volume, a large volume of excess sleeve material can be accommodated for the hole fill and lock formation. At the same time the substantial width enhances pin retention by virtue of the resultant, relatively large effective shear area. The relatively substantial width permits attainment of the desired volume without having to provide the groove with excessive depth. That is, lock groove 48 can be relatively shallow relative to breakneck groove 46.

From FIGS. 2A-2C it can be seen that the rivet 10 will provide hole filling over a substantial length of the openings 18 and 20 for the minimum grip condition of workpieces 22 and 24. This hole filling which is provided intermediate the ends of workpieces 22 and 24 preferably extends for at least around one-half of the total workpiece thickness in the minimum grip condition. Note that the material for both hole fill and lock formation is from the shank 28 of sleeve 12.

For the nominal 5/32" fastener previously noted the width of lock groove 48 is around one-third of its diameter. Also, hole fill and lock formation could occur for at least around one-third to one-half of the length of overall travel of the pin 14 and the width of lock groove 48 would be approximately one-third of the hole filled length. These ratios, of course, could change with different sized fasteners.

In some instances it may be desirable to engage the stop shoulder 44 at a position within the sleeve head 30 to provide pin break therewithin. This can be done with the modified construction shown in FIG. 9. In FIG. 9, components similar to like components in FIG. 1 have been given the same numeral designation with the addition of the letter postscript "g".

Thus in FIG. 9, the fastener 10g (only partially shown) has its sleeve 12g formed with a counterbore 70 in sleeve head 30g at the outer end of reduced bore 34g. The anvil 55g of tool 53g has a protruding ring 72 adapted to fit within the counterbore 70. In this way the stop land 44g on pin 14g will engage and/or be stopped by the ring 72 within the reduced bore 34g, whereby fracture at the breakneck groove 46g will occur farther within the sleeve head 30g.

Note that while anvil 55 is shown with a flat surface 59 adapted to engage the stop land 44 to arrest movement of the pin 14, this could also be accomplished by a conventional anvil in conjunction with a separate annular, expendible flat washer or ring; the latter washer would be a part of the assembly of fastener 10 and would be adapted to engage the flat sleeve head surface 61 and would be provided with an internal diameter less than stop land 44 such as to provide engagement with stop land 44 to stop the motion of pin 14.

Thus there is disclosed in the above description and in the drawings an illustrative embodiment of the invention which fully and effectively accomplishes the objects thereof. However, it will be apparent that variations in the details in the apparatus may be indulged in without departing from the sphere of the invention herein described, or the scope of the appended claims.

I claim:

1. A blind fastener for securing a plurality of workpieces having aligned openings and a combined total thickness varying from a preselected minimum thickness to a preselected maximum thickness with the difference therebetween being the grip range for the fastener and with the workpieces having a front surface and an opposite rear surface, said fastener comprising:

a hollow sleeve having a through bore, said sleeve having a sleeve shank portion and an enlarged sleeve head at one end, said sleeve head adapted to engage the front surface of the workpieces and said sleeve shank portion adapted to be located within said aligned openings within a preselected minimum and maximum clearance, a pin, said pin having a shank portion and an enlarged pin head, said pin shank portion adapted to be located within said bore of said sleeve with said pin head located at the end of said sleeve shank portion opposite said sleeve head, said pin adapted to move relative to said sleeve shank portion and to cause deformation of the same to form a blind head opposite said sleeve head in response to a relative axial force applied between said pin and said sleeve, said pin shank portion having a breakneck groove and being adapted to locate said breakneck groove at a generally uniform preselected position relative to said sleeve head when said fastener is applied to workpieces having a total thickness within the grip range between said preselected minimum and maximum thicknesses, grip compensating means located between said pin head and said opposite end of said sleeve shank and actuable to form said blind head from said sleeve shank and locate said breakneck groove at said generally uniform preselected position with said blind head formed, said grip compensating means moving within said bore of said sleeve to form said blind head and deforming radially to a greater extent from said minimum to said maximum thickness whereby the application of said fastener to workpieces varying in total thickness over said grip range is compensated by the magnitude of radial deformation of said compensating means, said pin having an enlarged diameter, extruding land portion, said through bore of said sleeve having a reduced diameter lock forming bore portion located substantially within said shank portion in radial alignment with said aligned openings over a substantial axial length and having a preselected interference with said extruding land portion whereby there will be excess material of said lock forming portion relative to said minimum and maximum clearance as said extruding land portion is moved therethrough, a lock groove located in said pin generally immediately adjacent said extruding land portion, said extruding land portion being movable within said lock forming bore portion for radially expanding said sleeve shank to fill said clearance with said aligned openings and to move said excess material into said lock groove to form a lock between said pin and said sleeve, said extruding land portion having a leading surface extending generally transversely to the pin axis, said leading extruding land surface terminating in a radially outer surface for engaging said lock forming bore portion and being generally inclined in a direction towards said pin head whereby shearing of said lock forming bore portion is inhibited, said lock groove being substantially wide and being contoured to have a relatively flat root with a preselected depth to define a desired volume such that at said maximum clearance said lock groove will be filled by said excess material across its axial width but not to its full depth and at said minimum clearance said excess material will generally not exceed said desired volume when said pin has moved to locate said breakneck groove at said preselected position, said lock forming bore portion communicating with an enlarged bore portion and extending in said sleeve shank generally from said sleeve head to a position around the location of said opposite rear surface at said minimum thickness of workpieces, a sleeve lock shoulder defined by the juncture of said lock forming bore portion and said enlarged bore portion, said outer surface of said leading extruding land surface having a maximum diameter to be snugly received within said enlarged bore portion, said lock groove having a width approximately one-third of the axial length of engagement of said lock forming bore portion by said extruding land portion.

2. The fastener of claim 1, with said pin including a guide land having a diameter to be snugly received within said lock forming bore portion, said guide land leading said extruding land for guiding and aligning said extruding land through said enlarged bore portion and into engagement with said sleeve lock shoulder and said lock forming bore portion, the trailing surface of said guide land defining the forward side of said lock groove, said guide land having a leading surface extending generally transversely to the axis of said pin and defining a stop surface engageable for stopping the movement of said pin when said breakneck groove is at said preselected position.

3. The fastener of claim 2, including means separate from said sleeve and extending into said through bore from said sleeve head for engaging said forward stop surface at a preselected distance within said sleeve head.

4. The fastener of claim 1, with said extruding land portion engaging said lock forming bore portion for an axial length at least around one-half of said minimum thickness of said workpiece, and for moving said excess material into said lock groove over said axial length.

5. The fastener of claim 1, with said extruding land portion engaging said lock forming bore portion for an axial length at least around one-third to around one-half of the travel of said pin relative to said sleeve to locate said breakneck groove at said preselected position and for moving said excess material into said lock groove over said axial length.

6. The fastener of claim 1, with said grip compensating means being tubular in construction and having a portion adapted to provide said radial deformation and being separate from said pin and sleeve.

7. The fastener of claim 1 with said minimum clearance being around 0.001" and said maximum clearance being around 0.005".

8. A blind fastener for securing a plurality of workpieces having aligned openings and a combined total thickness varying from a preselected minimum thickness to a preselected maximum thickness with the difference therebetween being the grip range for the fastener and with the workpieces having a front surface and an opposite rear surface, said fastener comprising:

a hollow sleeve having a through bore, said sleeve having a sleeve shank portion and an enlarged sleeve head at one end, said sleeve head adapted to engage the front surface of the workpieces and said sleeve shank portion adapted to be located within said aligned openings within a preselected minimum and maximum clearance, a pin, said pin having a shank portion and an enlarged pin head, said pin shank portion adapted to be located within said bore of said sleeve with said pin head located at the end of said sleeve shank portion opposite said sleeve head, said pin adapted to move relative to said sleeve shank portion and to cause deformation of the same to form a blind head opposite said sleeve head in response to a relative axial force applied between said pin and said sleeve, said pin shank portion having a breakneck groove and being adapted to locate said breakneck groove at a generally uniform preselected position relative to said sleeve head when said fastener is applied to workpieces having a total thickness within the grip range between said preselected minimum and maximum thicknesses, said pin having an enlarged diameter, extruding land portion, said through bore of said sleeve having a reduced diameter lock forming bore portion located substantially within said sleeve shank portion in radial alignment with said aligned openings over a substantial axial length and having a preselected interference with said extruding land portion whereby there will be excess material of said lock forming portion relative to said minimum and maximum clearance as said extruding land portion is moved therethrough, a lock groove located in said pin generally immediately adjacent said extruding land portion, said extruding land portion being movable within said lock forming bore portion for radially expanding said sleeve shank to fill said clearance with said aligned openings and to move said excess material into said lock groove to form a lock between said pin and said sleeve, said extruding land portion having a leading surface extending generally transversely to the pin axis, said leading extruding land surface terminating in a radially outer surface for engaging said lock forming bore portion and being generally inclined in a direction towards said pin head whereby shearing of said lock forming bore portion is inhibited, said lock groove being substantially wide and being contoured to have a relatively flat root with a preselected depth to define a desired volume such that at said maximum clearance said lock groove will be filled by said excess material across its axial width but not to its full depth and at said minimum clearance said excess material will generally not exceed said desired volume when said pin has moved to locate said breakneck groove at said preselected position, said lock forming bore portion communicating with an enlarged bore portion and extending in said sleeve shank generally from said sleeve head to a position around the location of said opposite rear surface at said minimum thickness of workpieces, a sleeve lock shoulder defined by the juncture of said lock forming bore portion and said enlarged bore portion, said outer surface of said leading extruding land surface having a maximum diameter to be snugly received within said enlarged bore portion, said lock groove having a width approximately one-third of said axial length of engagement of said lock forming bore portion by said extruding land portion.

9. The fastener of claim 8, with said pin including a guide land having a diameter to be snugly received within said lock forming bore portion, said guide land leading said extruding land for guiding and aligning said extruding land through said enlarged bore portion and into engagement with said sleeve lock shoulder and said lock forming bore portion, the trailing surface of said guide land defining the forward side of said lock groove, said guide land having a leading surface extending generally transversely to the axis of said pin and defining a stop surface engageable for stopping the movement of said pin when said breakneck groove is at said preselected position.

10. The fastener of claim 9, including means separate from said sleeve and extending into said through bore from said sleeve head for engaging said forward stop surface at a preselected distance within said sleeve head.

11. The fastener of claim 8, with said extruding land portion engaging said lock forming bore portion for an axial length at least around one-half of said minimum thickness of said workpieces and for moving said excess material into said lock groove over said axial length.

12. The fastener of claim 8, with said extruding land portion engaging said lock forming bore portion for an axial length at least around one-third to around one-half of the travel of said pin relative to said sleeve to locate said breakneck groove at said preselected position and for moving said excess material into said lock groove over said axial length.

13. The fastener of claim 8 with said minimum clearance being around 0.001" and said maximum clearance being around 0.005".

14. A blind fastener for securing a plurality of workpieces having aligned openings and a combined total thickness varying from a preselected minimum thickness to a preselected maximum thickness with the difference therebetween being the grip range for the fastener, said fastener comprising:
a hollow sleeve having a through bore,
said sleeve having a sleeve shank portion and an enlarged sleeve head at one end and adapted to be located within said aligned openings within a preselected minimum and maximum clearance,
a pin,
said pin having a shank portion and an enlarged pin head,
said pin shank portion adapted to be located within said bore of said sleeve with said pin head located at the end of said sleeve shank portion opposite said sleeve head,
said pin adapted to move relative to said sleeve shank portion and to cause deformation of the same to form a blind head opposite said sleeve head in response to a relative axial force applied between said pin and said sleeve, said pin shank portion having a breakneck groove and being adapted to locate said breakneck groove at a generally uniform preselected position relative to said sleeve head when said fastener is applied to workpieces having a total thickness within the grip range between said preselected minimum and maximum thicknesses,
grip compensating means located between said pin head and said opposite end of said sleeve shank and actuable to form said blind head from said sleeve shank and locate said breakneck groove at said generally uniform preselected position with said blind head formed,
said grip compensating means moving within said bore of said sleeve to form said blind head and deforming radially to a greater extent from said minimum to said maximum thickness whereby the application of said fastener to workpieces varying in total thickness over said grip range is compensated by the magnitude of radial deformation of said compensating means,
said pin having an enlarged diameter, extruding land portion,
said through bore of said sleeve having a reduced diameter lock forming bore portion located substantially within said shank portion in radial alignment with said aligned openings over a substantial axial length and having a preselected interference with said extruding land portion whereby there will be excess material of said lock forming portion relative to said minimum and maximum clearance as said extruding land portion is moved therethrough, a lock groove located in said pin generally immediately adjacent said extruding land portion,
said extruding land portion being movable within said lock forming bore portion for radially expanding said sleeve shank to fill said clearance with said aligned openings and to move said excess material into said lock groove to form a lock between said pin and said sleeve, said extruding land portion having a leading surface extending generally transversely to the pin axis, said leading extruding land surface terminating in a radially outer surface for engaging said lock forming bore portion and being generally inclined in a direction towards said pin head whereby shearing of said lock forming bore portion is inhibited,
said lock groove being substantially wide and being contoured to have a relatively flat root with a preselected depth to define a desired volume such that at said maximum clearance said lock groove will be filled by said excess material across its axial width but not to its full depth and at said minimum clearance said excess material will generally not exceed said desired volume when said pin has moved to locate said breakneck groove at said preselected position, said minimum clearance being around 0.001" and said maximum clearance being around 0.005", and the axial width of said lock groove relative to the diameter of said flat root being in a ratio of around 0.031 to around 0.079.

15. A blind fastener for securing a plurality of workpieces having aligned openings and a combined total thickness varying from a preselected minimum thickness to a preselected maximum thickness with the difference therebetween being the grip range for the fastener, said fastener comprising:
a hollow sleeve having a through bore,
said sleeve having a sleeve shank portion and an enlarged sleeve head at one end and adapted to be located within said aligned openings within a preselected minimum and maximum clearance,
a pin,
said pin having a shank portion and an enlarged pin head,
said pin shank portion adapted to be located within said bore of said sleeve with said pin head located at the end of said sleeve shank portion opposite said sleeve head, said pin adapted to move relative to said sleeve shank portion and to cause deformation of the same to form a blind head opposite said sleeve head in response to a relative axial force applied between said pin and said sleeve, said pin shank portion having a breakneck groove and being adapted to locate said breakneck groove at a generally uniform preselected position relative to said sleeve head when said fastener is applied to workpieces having a total thickness within the grip range between said preselected minimum and maximum thicknesses, said pin having an enlarged diameter, extruding land portion, said through bore of said sleeve having a reduced diameter lock forming bore portion located substantially within said sleeve shank portion in radial alignment with said aligned openings over a substantial axial length and having a preselected interference with said extruding land portion whereby there will be excess material of said lock forming portion relative to said minimum and maximum clearance as said extruding land portion is moved therethrough, a lock groove located in said pin generally immediately adjacent said extruding land portion, said extruding land portion being movable within said lock forming bore portion for radially expanding said sleeve shank to fill said clearance with said aligned openings and to move said excess material into said lock groove to form a lock between said pin and said sleeve, said extruding land portion having a leading surface extending generally transversely to the pin axis, said leading extruding land surface terminating in a radially outer surface for engaging said lock forming bore portion and being generally inclined in a direction towards said pin head whereby shearing of said lock forming bore portion is inhibited, said lock groove being substantially wide and being contoured to have a relatively flat root with a preselected depth to define a desired volume such that at said maximum clearance said lock groove will be filled by said excess material across its axial width but not to its full depth and at said minimum clearance said excess material will generally not exceed said desired volume when said pin has moved to locate said breakneck groove at said preselected position, said minimum clearance being around 0.001" and said maximum clearance being around 0.005", and with the axial width of said lock groove relative to the diameter of said flat root being in a ratio of around 0.031 to around 0.079.

* * * * *